Dec. 24, 1935.  E. L. KRAFT  2,025,596
WINDSHIELD FOR AUTOMOBILES
Filed Aug. 13, 1931  2 Sheets-Sheet 1
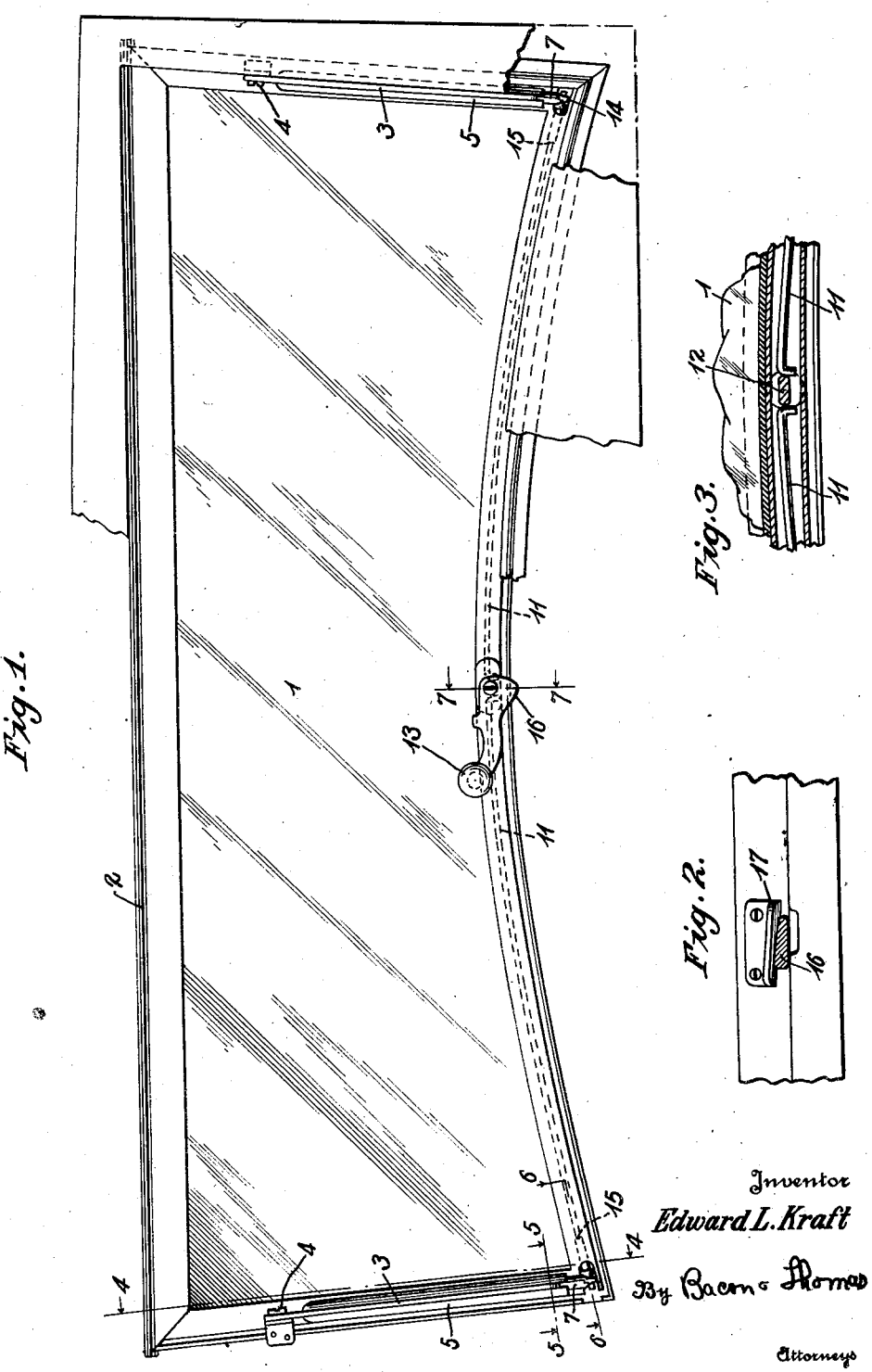

Dec. 24, 1935. E. L. KRAFT 2,025,596
WINDSHIELD FOR AUTOMOBILES
Filed Aug. 13, 1931 2 Sheets-Sheet 2
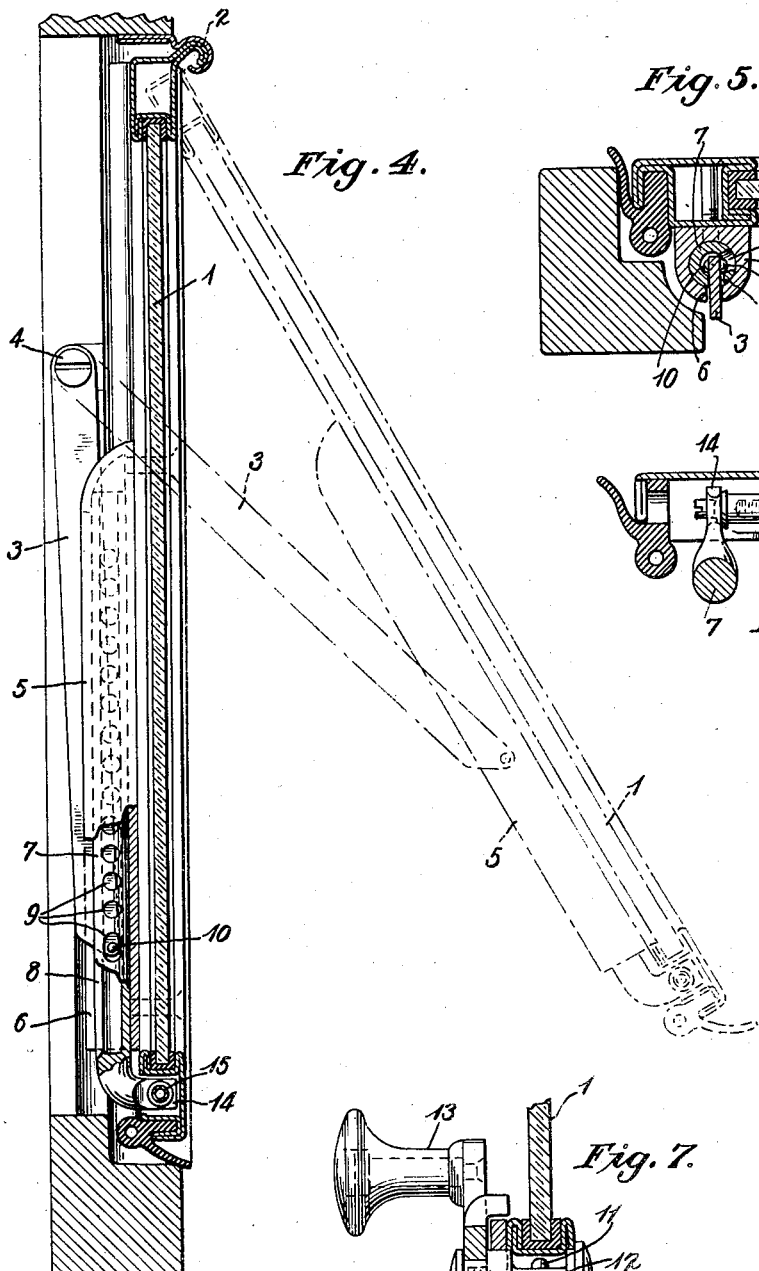
Inventor
Edward L. Kraft
By Bacon & Thomas
Attorneys

Patented Dec. 24, 1935

2,025,596

UNITED STATES PATENT OFFICE 2,025,596

WINDSHIELD FOR AUTOMOBILES

Edward L. Kraft, York, Pa., assignor to Martin-Parry Corporation, York, Pa., a corporation of Delaware Application August 13, 1931, Serial No. 556,919

1 Claim. (Cl. 296—84)

This invention relates to windshields for automobiles and is an improvement over the Beitman application Serial No. 386,780, filed August 19, 1929.

An object of the invention is to provide an improved locking mechanism for holding the windshield securely in any desired position of adjustment and it comprehends the use of mechanism incorporated in the parts of the windshield to obscure the same from vision with control mechanism capable of being actuated by the operator with one hand for effecting the adjustment of the shield.

More specifically, the invention comprehends the idea of providing a combined friction and positive locking mechanism for engaging the brace arms to hold the shield in its desired position of adjustment.

Numerous additional objects of the invention will be apparent to those skilled in the art from a reading of the following specification in conjunction with the drawings attached hereto and forming a part hereof in which Fig. 1 represents a front elevation of the "mono-control" for the shield;

Fig. 2 represents a detail view of the means for holding the shield against the frame when in closed position;

Fig. 3 is a detail view of the manner in which the concealed rods are spread apart for actuating the locking device hereinafter described;

Fig. 4 is a view partly in section taken on lines 4—4 of Fig. 1;

Fig. 5 is a cross sectional view taken on line 5—5 of Fig. 1 showing in detail the improved locking device constituting an important part of the invention;

Fig. 6 is another detail view taken on line 6—6 of Fig. 1 showing the manner in which the rotatable locking tube is actuated by the longitudinally movable locking rods; and Fig. 7 is a detail view taken on line 7—7 of Fig. 1 showing the lip provided by the control handle for engaging a cam fixed to the windshield frame for holding the shield tightly in its closed position.

In the art of mono-control windshields, as shown and claimed in the Beitman application aforesaid, the various parts of the locking mechanism are concealed from view and are so constructed that the operator by simply grasping a conveniently located handle may release concealed clamping mechanism and simultaneously with the same hand adjust the shield to a desired position and there lock it. When friction alone, however, is relied upon, there is some possibility due to wear and tear or other causes of the shield, when the automobile is traveling over rough roads at high speeds, slipping relative to the bracing arms. I therefore devised an improved locking mechanism which combines a friction clamp with a positive tooth engagement whereby to obviate the possibility of slippage. By reason of this improvement, it is possible to use only one bracing link on one side of the shield, if desired, as it has been found that one bracing link, when equipped with the improved locking mechanism to be hereinafter described, is sufficient.

Referring now particularly to the drawings, 1 represents a conventional windshield of the outward and upward swinging type hinged to the frame by a piano hinge 2 which constitutes no part of this invention. Pivotally secured to the windshield frame are bracing links 3 pivoted as at 4. The windshield, preferably as an adjunctive part thereof, has a channel-shaped bracket 5 slotted as at 6 in which the brace 3 is adapted to slide in accordance with the movements of the shield. Positioned within this channel-shaped bracket is a rotatable locking tube 7 which is also provided with a slot 8 into which the end of the brace projects and slides. This rotatable locking tube is additionally provided on the side thereof with a series of apertures 9. The brace at its lower end has oppositely disposed protuberances 10, as clearly shown in Fig. 5, the purpose of which will be clear from a further description to be now given.

Located within the windshield sash there are provided longitudinally movable rods 11 which are spread apart by the cam 12 upon the rotation of the control handle 13. The opposite ends of these locking rods are secured to the crank 14 provided by the lower ends of the locking tubes 7, as shown particularly in Fig. 6. This connection may be adjusted by the screws 15. Upon the longitudinal spreading movement of the rods 11 caused by the actuation of the control handle 13, the bell crank 14 is turned which causes corresponding rotation of the locking tube 7 which in turn engages the end of the brace arm secured within the channel-shaped bracket and within the locking tube to frictionally restrain the relative longitudinal movement between the brace and the shield and which therefore fixes the shield in its adjusted position. The rotative movement of the locking tube further tends to force the brace arm inwardly so that the protuberances 9 engage within one of the spaced apertures and consequently supplements the purely frictional clamping action to positively prevent the weight of the shield from causing slippage between the bracket and the brace arms. It will be observed furthermore that these protuberances, positioned on the opposite faces of the lower ends of the brace arms, prevent the brace arms from disengagement with the rotative locking tube and the channel-shaped bracket.

From the foregoing it is believed that the operation of the device will be apparent. The operator when driving the car with one hand on the shield may simply grab the handle 13, lift it upwardly which will release the cam 12 from engagement with the longitudinal locking rods, and through their connection with the bell crank 14 of the locking tube cause the rotation of the locking tube in such a position as to permit the extremities of the brace arms to slide freely within the slots of the locking tube 7 and the channel-shaped bracket 5 respectively. This movement continues until the shield has reached the desired position of adjustment, 90° being possible if desired, whereupon the operator simply turns the handle 13 back to its original position which causes the tube to be rotated for the purpose of clamping the end of the bracing arm and for urging the protuberances into engagement with the apertures provided by the locking tube.

When the shield is brought to its closed position, the handle is rotated so that the lip 16 engages behind the cam 17 for tightly holding the shield to the stationary frame.

What I claim as new is:

In combination, a windshield frame, a windshield pivotally connected to the frame, a brace arm pivoted at one end to the frame and having a lateral protuberance at its free end, a housing secured to one side margin of the windshield and having a longitudinally extending slot and an open lower end, the bore of said housing being of circular formation in cross section, a circular locking tube rotatably journaled in the bore of the housing, said locking tube having a longitudinally extending slot registering with the slot in the housing and a longitudinal series of apertures located 90° around the tube from its slot, the lower end of the tube projecting from the open end of the housing, the free end of the brace arm adapted to extend through the slots of the housing and locking tube to have its protuberance register with said series of apertures, a lever arm formed on the projecting end of the locking tube, and an operating handle mounted on the windshield and connected to said lever arm to exert and maintain rotational force on said tube to frictionally bind the free end of the brace arm between opposed edges of the slots in the housing and locking tube and to cause the said protuberance to enter one of the series of apertures to positively lock the arm to the tube.

EDWARD L. KRAFT.